P. J. GUYAUX, Sr., P. J. GUYAUX, Jr. & F. GUYAUX.
METHOD OF AND APPARATUS FOR MAKING WIRE GLASS.
APPLICATION FILED JUNE 16, 1909.
954,956.
Patented Apr. 12, 1910.
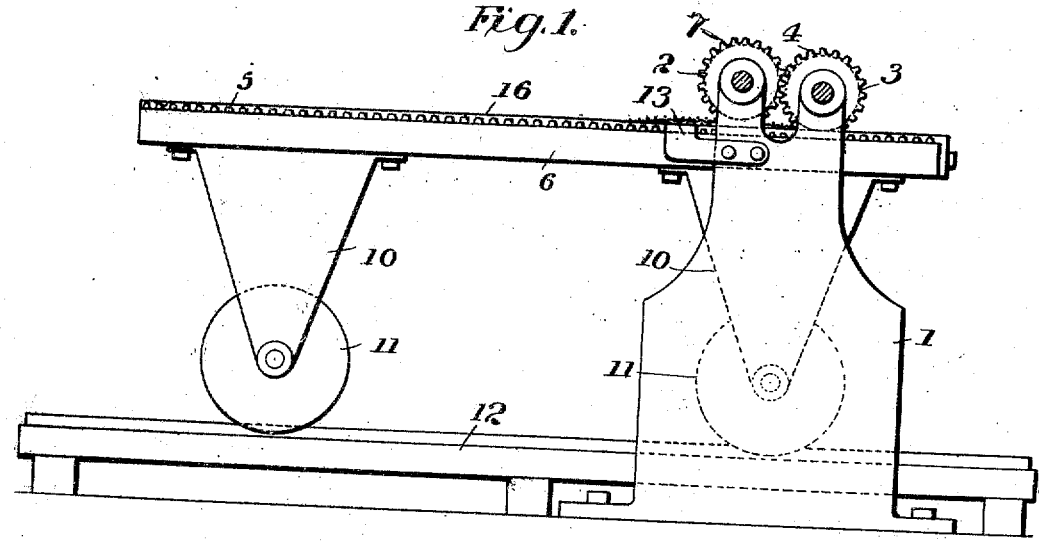
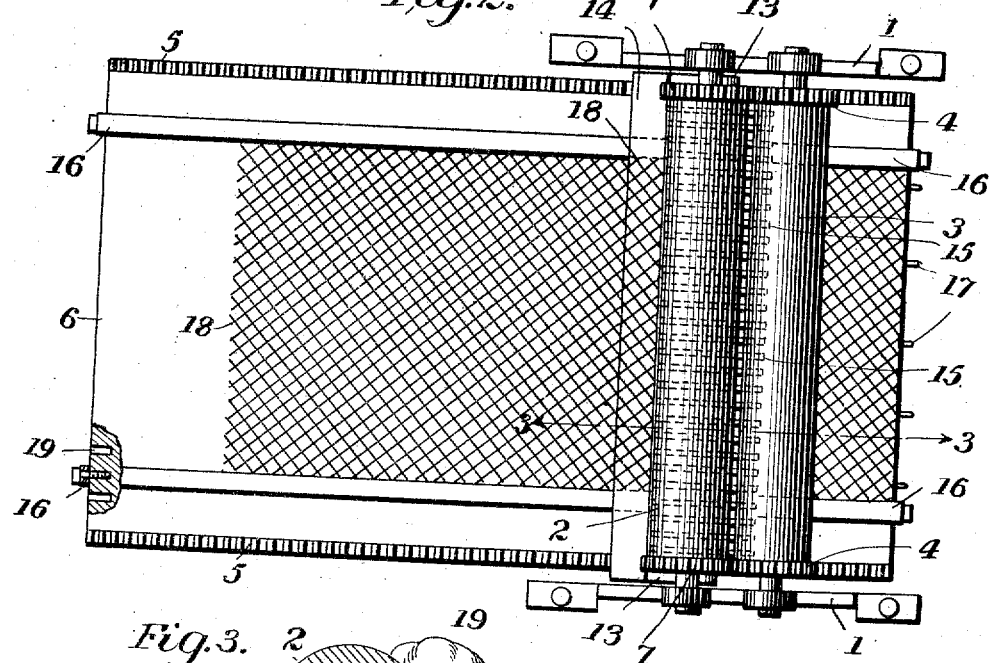
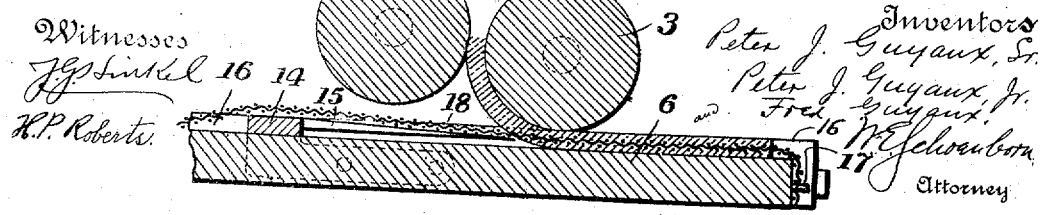

UNITED STATES PATENT OFFICE.

PETER J. GUYAUX, SR., PETER J. GUYAUX, JR., AND FRED GUYAUX, OF POINT MARION, PENNSYLVANIA.

METHOD OF AND APPARATUS FOR MAKING WIRE-GLASS.

954,956.   Specification of Letters Patent.   Patented Apr. 12, 1910.

Application filed June 16, 1909. Serial No. 502,489.

*To all whom it may concern:*

Be it known that we, PETER J. GUYAUX, Sr., PETER J. GUYAUX, Jr., and FRED GUYAUX, citizens of the United States, residing at Point Marion, in the county of Fayette and State of Pennsylvania, have invented certain new and useful Improvements in Methods of and Apparatus for Making Wire-Glass, of which the following is a specification.

Our invention has reference to an improved method and apparatus for the manufacture of wire glass.

The object of our invention is to provide a method and apparatus which shall positively cause the meshed wire to be placed in the sheet of glass in such manner that the meshed wire shall be properly inclosed in the glass midway between or near the middle of its two surfaces, so as to make a perfect article, namely, one in which the meshed glass is fully covered and uniformly positioned within the glass sheet midway between its surfaces, and without bubbles or feathers.

More specifically, our improved process and apparatus consists in rolling a mass of molten glass between two rollers, thereby forming the glass into the desired thickness before it is dropped on the wire. The soft glass sheet is then dropped on a moving table on which the wire mesh is securely placed. The wire mesh is slidably supported on the table by a fixed comb or frame secured to the pedestals which support the rollers. The supporting comb or frame being one half the desired thickness of the sheet, places the wire midway between the surfaces of the sheet. The moving table then carries the sheet under a roller, placing the wire in the center of the sheet by means of the comb. The forming or pressing roller is supported on the table by two bars of the same thickness as the sheet to be formed, extending the full length of the table, and by means of these bars the original thickness of the sheet is maintained.

The invention consists of structural features and relative arrangements of parts which will be hereafter more fully described and particularly pointed out in the appended claims.

In the accompanying sheet of drawings similar reference characters indicate the same parts in the several figures of drawing in which:

Figure 1 is a side view of the apparatus for carrying out our invention. Fig. 2 is a top plan view and Fig. 3 is an enlarged sectional view on line 3—3 of Fig. 2.

In the drawing 1, 1, are pedestals or frames for supporting at the upper ends a fixed roller 2 and a forming roller 3, said roller 3 having a horizontal adjustment with respect to the roller 2, and provided with a gear 4, at each end engaging the racks 5, 5, on each side and top of the moving table 6, to be hereinafter described. The roller 2 is also provided at the ends of its axle with gears 7, which intermesh with the gears 4 of the roller 3 and is put into motion by the forming roller 3. Instead of providing an adjustable roller 3, rollers of different diameters may be provided which can be substituted for each other.

6, is a moving table supported by means of frames 10, 10, carrying wheels 11, 11, moving on tracks 12, 12. The table 6, on each side is provided with a rack 5 which engages the side gears 4, 4, on roller 3, and as the table 6 is moved back and forth, said roller 3 is rotated which in turn rotates the roller 2 as above explained. Attached to the pedestals or frames on each side is a supporting comb or frame 13, which is firmly supported over and upon the upper surface of the moving table as shown. Said comb or frame 13, extends under the roller 2 and part way under the roller 3 as shown in Figs. 1 and 2, and consists of a transverse bar 14, having projecting therefrom a series of separated rods 15, 15, whose function will be hereinafter explained.

16, 16, are rods or strips adjustably secured in the top of the table, which mark not only the outer limits of the sheet of glass but by their depth control the thickness of the sheet, since the roller 3 is made to rest on the top of the strips 16 when said strips pass under the roller 3 by the movement of the table 6.

The rollers 2, and 3, are so arranged and attached that any thickness of sheet can be made by using the proper diameter of roller 3. It will be also seen that the roller 3 has a double function of not only acting as a feed roller and preliminary soft sheet forming roller in conjunction with the roller 2, but also in coöperation with the moving table 6, properly places the wire mesh and forces the soft glass sheet on each side and uniformly on the wire mesh.

17, 17, are pins or other adjustable means on the end of the table 6 for attaching the edge of the wire mesh 18 resting on and carried by the table 6.

The mode of carrying out our process and operating the machine is as follows: The rollers 2 and 3 of proper diameter are arranged with respect to each other to form the desired thickness, and a corresponding thickness of rods or strips 16, are securely placed on the table 6, to maintain this thickness of the sheet so that the desired sheet will be formed. The wire mesh 18, is properly placed on the table 6 between the strips 16, 16, and having its edge fastened to the pins 17, 17, the table 6 is rolled back so that the fastened edge of the wire mesh 18 is under the roller 3. The molten glass 19 is then poured between the two rollers 2 and 3 and the table 6 is then moved forward, dragging the wire mesh 18 with it over the top of the fixed comb or frame 13, and at the same time rotating the rollers 2 and 3. This causes the molten glass 19 to pass from the rollers 2 and 3 in the form of a soft sheet of the dimensions and thickness desired, this soft sheet dropping on the wire mesh which is supported at this point by the supporting comb or frame 13, said comb being one-half the thickness of the sheet above the moving surface of the table 6, thereby causing the wire mesh to be firmly held thus some distance above the surface of the table 6 or about midway between the surfaces of the sheet. As this soft glass sheet formed and placed on the wire mesh as above indicated, passes under the roller 3, a portion of the soft sheet is forced through and on the under side of the wire mesh and firmly and integrally pressed into a sheet of wire glass.

We have found by using the above described form of comb 13, and having the glass in the form of a soft sheet we are able to form a sheet of wire glass free from such defects as bubbles and feathers, and at the same time preventing the wire mesh from being burned.

It will be readily seen from the foregoing description of the method of operating and the apparatus for carrying out the same, that many changes could readily suggest themselves to any one skilled in the art, and we desire it to be understood that we do not care to limit ourselves to the exact number, construction, and relation of rollers for forming the soft sheet of glass and the wire glass, as other rollers could be added, or the soft glass sheet placed on the wire mesh could be made in other ways than that shown or described.

What we claim as new and desire to secure by Letters Patent is as follows:

1. The method of making wire glass which comprises forming a sheet of soft glass, horizontally supporting a sheet of wire mesh, dropping said soft sheet glass on top of the wire mesh, passing a portion of said sheet of glass through the wire mesh and then pressing said soft glass sheet and wire mesh into wire glass.

2. The method of making wire glass which comprises forming a sheet of soft glass, supporting a sheet of wire mesh, juxtaposing said sheet of soft glass and wire mesh, passing a portion of said soft sheet of glass through the wire mesh, and then pressing said soft glass sheet and wire mesh into wire glass.

3. The method of making wire glass which comprises rolling a sheet of soft glass, horizontally supporting a sheet of wire mesh, dropping said soft sheet glass on top of the wire mesh, simultaneously pressing a portion of the soft sheet glass through the wire mesh and pressing the soft glass sheet and wire mesh into wire glass.

4. An apparatus for making wire glass comprising two rollers for making a sheet of soft wire glass, a movable table for horizontally supporting a wire mesh, means for transporting said table and mesh in juxtaposition to one of said rollers, means connected to said table for rotating the rollers, and means for supporting a wire mesh above the plane of the table substantially equal to one half the thickness of the wire glass sheet desired.

5. An apparatus for making wire glass comprising a frame, two horizontal rollers in juxtaposition to each other and rotatably supported on said frame, a gear on each roller intermeshing with each other, a fixed supporting comb under said rollers, a horizontal table reciprocating under and in juxtaposition to said rollers, means on said table for carrying a wire mesh and dragging it over the supporting comb and between one of said rollers and table.

6. An apparatus for making wire glass comprising a frame, two horizontal rollers in juxtaposition to each other and rotatably supported on said frame, a gear on each roller intermeshing with each other, a fixed supporting comb under said rollers, a horizontal table reciprocating under and in juxtaposition to one of said rollers and comb, means on said table for engaging and rotating the rollers, and means for supporting a wire mesh on the upper plane of the table and dragging it over the supporting comb and between one of the rollers and table.

In testimony whereof we affix our signatures in presence of two witnesses.

PETER J. GUYAUX, SR.
PETER J. GUYAUX, JR.
FRED GUYAUX.

Witnesses:
HOWARD H. CLARK,
H. D. CLARK.